(12) United States Patent
Bae

(10) Patent No.: US 12,094,460 B2
(45) Date of Patent: Sep. 17, 2024

(54) ELECTRONIC DEVICE AND VOICE RECOGNITION METHOD THEREOF

(71) Applicant: SAMSUNG ELECTRONICS CO., LTD., Suwon-si (KR)

(72) Inventor: Jae-Hyun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 774 days.

(21) Appl. No.: 16/317,865

(22) PCT Filed: Jul. 18, 2017

(86) PCT No.: PCT/KR2017/007738
§ 371 (c)(1),
(2) Date: Jan. 15, 2019

(87) PCT Pub. No.: WO2018/021750
PCT Pub. Date: Feb. 1, 2018

(65) Prior Publication Data
US 2021/0280178 A1   Sep. 9, 2021

(30) Foreign Application Priority Data

Jul. 27, 2016   (KR) .................. 10-2016-0095301

(51) Int. Cl.
*G10L 15/08*   (2006.01)
*G10L 15/22*   (2006.01)
(Continued)

(52) U.S. Cl.
CPC ............. *G10L 15/22* (2013.01); *G10L 15/26* (2013.01); *G10L 15/32* (2013.01); *G10L 2015/088* (2013.01)

(58) Field of Classification Search
CPC .......... G10L 15/22; G10L 15/26; G10L 15/30
See application file for complete search history.

(56) References Cited

U.S. PATENT DOCUMENTS 5,577,164 A * 11/1996 Kaneko .................. G10L 15/22
704/251
7,502,738 B2 * 3/2009 Kennewick ......... G10L 15/1822
704/275

(Continued)

FOREIGN PATENT DOCUMENTS

EP   2122979 B1 *  9/2016  ............. H04L 12/24
JP   11-175095 A   7/1999

(Continued)

OTHER PUBLICATIONS

Che-Kuang Lin et al., "Improved Features and Models for Detecting Edit Disfluencies in Transcribing Spontaneous Mandarin Speech", IEEE Transactions on Audio, Speech, and Language Processing, vol. 17, No. 7, IEEE, XP011270506, Jul. 14, 2009, pp. 1263-1278.

(Continued)

*Primary Examiner* — Daniel C Washburn
*Assistant Examiner* — Oluwadamilola M Ogunbiyi
(74) *Attorney, Agent, or Firm* — Sughrue Mion, PLLC

(57) ABSTRACT

An electronic device is disclosed. The electronic device comprises: a voice reception unit for receiving user's voice; a storage unit for storing a first speech recognition module for recognizing user's voice and a second speech recognition module for recognizing only predetermined voice in the user's voice; and a processor for performing speech recognition of only a part of the user's voice through the first speech recognition module, when a result of speech recognition through the second speech recognition module shows that the user's voice includes the predetermined voice.

14 Claims, 7 Drawing Sheets

(51) Int. Cl.
 *G10L 15/26* (2006.01)
 *G10L 15/32* (2013.01)

(56) References Cited

U.S. PATENT DOCUMENTS

| | | | |
|---|---|---|---|
| 7,983,921 B2 | 7/2011 | Hirota et al. | |
| 8,200,495 B2 * | 6/2012 | Braho | G10L 15/22 |
| | | | 704/275 |
| 8,504,369 B1 * | 8/2013 | Chigier | G06F 40/103 |
| | | | 704/271 |
| 9,462,230 B1 * | 10/2016 | Agrawal | G06Q 50/20 |
| 9,484,029 B2 * | 11/2016 | Jung | G10L 15/22 |
| 9,679,570 B1 * | 6/2017 | Edara | G06Q 30/0255 |
| 9,805,714 B2 * | 10/2017 | Pandya | G10L 21/0208 |
| 10,176,802 B1 * | 1/2019 | Ladhak | G10L 15/16 |
| 10,178,218 B1 * | 1/2019 | Vadodaria | G06F 40/30 |
| 10,236,017 B1 * | 3/2019 | Witt-Ehsani | G06F 40/35 |
| 10,817,527 B1 * | 10/2020 | Setlur | G06F 3/04847 |
| 11,010,396 B1 * | 5/2021 | Setlur | G06F 3/04847 |
| 2002/0156627 A1 * | 10/2002 | Itoh | G10L 15/187 |
| | | | 704/E15.02 |
| 2003/0055655 A1 * | 3/2003 | Suominen | G06F 3/167 |
| | | | 704/276 |
| 2003/0074195 A1 * | 4/2003 | Bartosik | G10L 15/22 |
| | | | 704/E15.04 |
| 2003/0115289 A1 * | 6/2003 | Chinn | G06F 16/10 |
| | | | 709/219 |
| 2004/0148170 A1 * | 7/2004 | Acero | G06F 40/216 |
| | | | 704/257 |
| 2005/0131677 A1 * | 6/2005 | Assadollahi | G10L 15/22 |
| | | | 704/201 |
| 2007/0118514 A1 * | 5/2007 | Mariappan | G06F 16/951 |
| 2007/0239453 A1 * | 10/2007 | Paek | G10L 15/065 |
| | | | 704/257 |
| 2008/0109223 A1 | 5/2008 | Hirota et al. | |
| 2008/0189106 A1 * | 8/2008 | Low | G01C 21/3608 |
| | | | 704/E15.001 |
| 2008/0208577 A1 * | 8/2008 | Jeong | G10L 15/16 |
| | | | 704/E15.001 |
| 2009/0204409 A1 | 8/2009 | Mozer et al. | |
| 2009/0228274 A1 * | 9/2009 | Terrell, II | G10L 15/22 |
| | | | 704/235 |
| 2009/0253463 A1 * | 10/2009 | Shin | G10L 17/22 |
| | | | 455/563 |
| 2009/0306980 A1 * | 12/2009 | Shin | G06F 3/0236 |
| | | | 704/235 |
| 2010/0009720 A1 * | 1/2010 | Cha | G06F 3/167 |
| | | | 455/566 |
| 2010/0169098 A1 * | 7/2010 | Patch | 704/275 |
| 2011/0161077 A1 | 6/2011 | Bielby | |
| 2011/0301943 A1 * | 12/2011 | Patch | G10L 15/26 |
| | | | 704/9 |
| 2012/0215539 A1 | 8/2012 | Juneja | |
| 2013/0080177 A1 * | 3/2013 | Chen | G10L 15/26 |
| | | | 704/275 |
| 2013/0103397 A1 * | 4/2013 | Almaer | G06F 16/24578 |
| | | | 704/233 |
| 2013/0238312 A1 * | 9/2013 | Waibel | G06F 40/117 |
| | | | 704/8 |
| 2013/0325482 A1 * | 12/2013 | Tzirkel-Hancock | G10L 21/18 |
| | | | 704/275 |
| 2013/0332168 A1 * | 12/2013 | Kim | G10L 15/22 |
| | | | 704/251 |
| 2014/0088952 A1 * | 3/2014 | Fife | H04N 21/442 |
| | | | 704/9 |
| 2014/0146644 A1 * | 5/2014 | Chen | G08C 17/02 |
| | | | 367/197 |
| 2014/0160316 A1 * | 6/2014 | Hwang | G06F 16/5866 |
| | | | 348/231.99 |
| 2014/0297268 A1 * | 10/2014 | Govrin | G06N 5/04 |
| | | | 704/9 |
| 2014/0316764 A1 * | 10/2014 | Ayan | H04M 3/4936 |
| | | | 704/9 |
| 2014/0337032 A1 * | 11/2014 | Aleksic | G10L 15/26 |
| | | | 704/257 |
| 2014/0337370 A1 * | 11/2014 | Aravamudan | G10L 15/22 |
| | | | 707/759 |
| 2015/0019216 A1 * | 1/2015 | Singh | G06F 16/24578 |
| | | | 704/235 |
| 2015/0095032 A1 * | 4/2015 | Li | G10L 15/08 |
| | | | 704/255 |
| 2015/0187355 A1 * | 7/2015 | Parkinson | G06F 3/011 |
| | | | 704/235 |
| 2015/0199977 A1 * | 7/2015 | Ungstrup | G10L 13/00 |
| | | | 704/260 |
| 2015/0261496 A1 * | 9/2015 | Faaborg | G10L 15/00 |
| | | | 715/728 |
| 2015/0269857 A1 * | 9/2015 | Feng | G09B 7/00 |
| | | | 434/353 |
| 2015/0302856 A1 * | 10/2015 | Kim | G10L 25/48 |
| | | | 704/273 |
| 2015/0350438 A1 * | 12/2015 | Arslan | G10L 25/84 |
| | | | 379/88.01 |
| 2016/0027440 A1 | 1/2016 | Gelfenbeyn et al. | |
| 2016/0063998 A1 | 3/2016 | Krishnamoorthy et al. | |
| 2016/0180214 A1 * | 6/2016 | Kanevsky | G10L 15/063 |
| | | | 706/21 |
| 2016/0217795 A1 * | 7/2016 | Lee | G10L 17/06 |
| 2016/0225371 A1 * | 8/2016 | Agrawal | G06F 3/0488 |
| 2016/0350306 A1 * | 12/2016 | Hurley | G06F 16/248 |
| 2017/0046320 A1 * | 2/2017 | Reicher | G06F 3/0481 |
| 2017/0186443 A1 * | 6/2017 | Totzke | G10L 15/22 |
| 2017/0206901 A1 * | 7/2017 | Gunn | G10L 15/08 |
| 2017/0213552 A1 * | 7/2017 | Gupta | G10L 15/26 |
| 2017/0213553 A1 * | 7/2017 | Gunn | G06F 1/3234 |
| 2017/0229119 A1 * | 8/2017 | Jang | G10L 15/08 |
| 2017/0236512 A1 * | 8/2017 | Williams | G06F 3/165 |
| | | | 381/79 |
| 2017/0249956 A1 * | 8/2017 | Dey | G06F 16/337 |
| 2017/0351487 A1 * | 12/2017 | Aviles-Casco Vaquero | |
| | | | G06F 3/167 |
| 2018/0033430 A1 * | 2/2018 | Kawano | G10L 15/28 |
| 2018/0048943 A1 * | 2/2018 | Melkote | G11B 27/005 |
| 2018/0061399 A1 * | 3/2018 | Rose | G10L 15/22 |
| 2018/0293299 A1 * | 10/2018 | Gallagher | G06F 16/3325 |
| 2018/0308470 A1 * | 10/2018 | Park | G10L 15/063 |
| 2018/0314689 A1 * | 11/2018 | Wang | G10L 15/1822 |
| 2018/0321905 A1 * | 11/2018 | Fountaine | G06F 3/167 |
| 2018/0350359 A1 * | 12/2018 | Bakar | G10L 15/22 |
| 2019/0019512 A1 * | 1/2019 | Taki | G06F 3/16 |
| 2019/0035399 A1 * | 1/2019 | Chakladar | G10L 15/26 |
| 2020/0279555 A1 * | 9/2020 | Shapiro | G10L 15/22 |

FOREIGN PATENT DOCUMENTS

| | | |
|---|---|---|
| JP | 2001-075589 A | 3/2001 |
| JP | 2002-073079 A | 3/2002 |
| JP | 2008-122483 A | 5/2008 |
| JP | 2012-037820 A | 2/2012 |
| JP | 2016-11995 A | 1/2016 |
| KR | 10-2012-0043552 A | 5/2012 |
| KR | 10-2012-0110751 A | 10/2012 |
| KR | 10-2013-0063091 A | 6/2013 |
| KR | 10-2015-0027592 A | 3/2015 |
| WO | WO-2015163684 A1 * | 10/2015 ............ G10L 15/02 |

OTHER PUBLICATIONS

Wen Wang et al., "Automatic Disfluency Removal for Improving Spoken Language Translation", Acoustics Speech and Signal Processing (ICASSP), 2010 IEEE International Conference On, IEEE, XP031696974, Piscataway, NJ, Mar. 14, 2010, pp. 5214-5217.

Hany Hassan et al., "Segmentation and Disfluency Removal for Conversational Speech Translation", Interspeech 2014, ISCA, XP055594870, Singapore, Sep. 14, 2014, pp. 318-322.

Communication dated Jun. 21, 2019, issued by the European Patent Office in counterpart European Application No. 17834692.0.

(56) References Cited

OTHER PUBLICATIONS

Communication dated Feb. 23, 2021 issued by the European Intellectual Property Office in counterpart European Application No. 20201122.7.
International Search Report (PCT/ISA/210) dated Oct. 24, 2017 issued by the International Searching Authority in International Application No. PCT/KR2017/007738.
Written Opinion (PCT/ISA/237) dated Oct. 24, 2017 issued by the International Searching Authority in International Application No. PCT/KR2017/007738.
Anonymous, "Using Voice Commands on My Mobile Phone", 2016, Microsoft, (10 pages total).
Communication dated Sep. 21, 2022 issued by the State Intellectual Property Office of the P.R.China in application No. 201780046774.X.
Communication dated Dec. 7, 2022 issued by the European Patent Office in application No. 20201122.7.
Communication issued May 4, 2023 by the China National Intellectual Property Administration in counterpart Chinese Patent Application No. 201780046774.X.
Communication issued on Aug. 31, 2023 by the Korean Intellectual Property Office for Korean Patent Application No. 10-2016-0095301.
Communication issued on Nov. 1, 2023 by the China National Intellectual Property Administration for Chinese Patent Application No. 201780046774.X.
Communication dated May 16, 2024, issued by the Korean Intellectual Property Office in Korean Patent Application No. 10-2016-0095301.
Communication dated Jun. 26, 2024, issued by the European Patent Office in counterpart European Application No. 20201122.7.

* cited by examiner (a)

(b)

ELECTRONIC DEVICE AND VOICE RECOGNITION METHOD THEREOF

TECHNICAL FIELD

The present disclosure relates generally to an electronic device, and a speech recognition method thereof, and for example, to an electronic device which recognizes user's voice and a speech recognition method thereof.

DESCRIPTION OF RELATED ART

The recent advancement of technology has enabled users to control an electronic device in various ways, and the speech recognition is one way.

In a related-art speech recognition, a user prepares a speech recognition system and then, utters voice, and the speech recognition system receives voice uttered by the user, and performs an operation accordingly.

In this situation, when the user utters unintended voice, the speech recognition system still performs speech recognition of the user's voice, providing an incorrect speech recognition result. In this case, it is necessary that the user utters voice of a correct content again, which induces inconvenience.

Accordingly, a measure for providing an accurate speech recognition result corresponding to an intention of user's voice even when the user utters unintended voice.

DETAILED DESCRIPTION

Technical Problem

Aspects of the disclosure are to address at least the above-mentioned problems and/or disadvantages and to provide at least the advantages described below. Accordingly, an aspect of the disclosure is to provide an electronic device for, through a separate speech recognition module for recognizing only erroneously-uttered voice, recognizing the corresponding voice, and performing speech recognition of only the remaining voice other than the corresponding voice, and a speech recognition method thereof.

Solution to Problem

In accordance with an aspect of the disclosure, an electronic device is provided. The electronic device includes a voice reception unit for receiving user's voice, a storage unit for storing a first speech recognition module for recognizing user's voice and a second speech recognition module for recognizing only predetermined voice in the user's voice, a processor for performing speech recognition of only a part of the user's voice through the first speech recognition module, when a result of speech recognition through the second speech recognition module shows that the user's voice includes the predetermined voice.

The predetermined voice may include voice which is uttered with an intention of canceling voice uttered by a user prior to the predetermined voice.

The processor may perform speech recognition of only voice present after the predetermined voice in the user's voice through the first speech recognition module.

The predetermined voice may include voice which is meaninglessly uttered by a user.

The processor may perform speech recognition of only remaining voice other than the predetermined voice in the user's voice through the first speech recognition module.

The processor may control an operation of the electronic device based on the result of speech recognition.

The processor may, if a speech recognition score calculated for the predetermined voice by the second speech recognition module is greater than or equal to a predetermined threshold, perform speech recognition of only a part of the user's voice through the first speech recognition module.

The processor may, when the predetermined voice is not recognized in the user's voice through the second speech recognition module, control an operation of the electronic device based on the result of speech recognition of the user's voice through the first speech recognition module.

In accordance with another aspect of the disclosure, a speech recognition method of an electronic device configured to store a first speech recognition module for recognizing user's voice, and a second speech recognition module for recognizing only predetermined voice in the user's voice is provided. The speech recognition method includes receiving user's voice, and performing speech recognition of only a part of the user's voice through the first speech recognition module, when a result of speech recognition through the second speech recognition module shows that the user's voice includes the predetermined voice.

The predetermined voice may include voice which is uttered with an intention of canceling voice uttered by a user prior to the predetermined voice.

The performing may include performing speech recognition of only voice present after the predetermined voice in the user's voice through the first speech recognition module.

The predetermined voice may include voice which is meaninglessly uttered by a user.

The performing may include performing speech recognition of only remaining voice other than the predetermined voice in the user's voice through the first speech recognition module.

The speech recognition method may further include controlling an operation of the electronic device based on the result of speech recognition.

The performing may include, if a speech recognition score calculated for the predetermined voice by the second speech recognition module is greater than or equal to a predetermined threshold, performing speech recognition of only a part of the user's voice through the first speech recognition module.

The speech recognition method may include, when the predetermined voice is not recognized in the user's voice through the second speech recognition module, controlling an operation of the electronic device based on the result of speech recognition of the user's voice through the first speech recognition module.

In accordance with another aspect of the disclosure, an electronic device is provided. The electronic device includes a voice reception unit for receiving user's voice, a storage unit for storing a speech recognition module for recognizing user's voice, and
  a processor for, when a result of speech recognition through the speech recognition module shows that predetermined voice is present, performing speech recognition of only a part excluding the predetermined voice in the result of speech recognition.

The speech recognition module may include a first speech recognition module for recognizing user's voice, and a second speech recognition module for recognizing only predetermined voice in the user's voice.

In a case that the predetermined voice recognized through the second speech recognition module corresponds to voice uttered with the intention of canceling voice uttered by the user prior to the predetermined voice, the processor may perform speech recognition of only voice present after the predetermined voice in the user's voice through the first speech recognition module.

Effect of the Invention

According to the various example embodiments described above, even if the user utters voice unintentionally during speech recognition, the corresponding voice is eliminated and the speech recognition is performed, and thus the user can perform an operation corresponding to an intention of utterance of the user's voice even if the user does not perform the speech recognition from the beginning again by uttering the corresponding voice again. In addition, the speech recognition of the corresponding voice is performed through a separate module for recognizing only voice not intended by the user, thereby strengthening the speech recognition performance.

PREFERRED EMBODIMENTS FOR CARRYING OUT THE INVENTION

Embodiments for Carrying Out the Invention

Hereinafter, example embodiments of the present disclosure will be described in greater detail with reference to the accompanying drawings.

Figure 1:
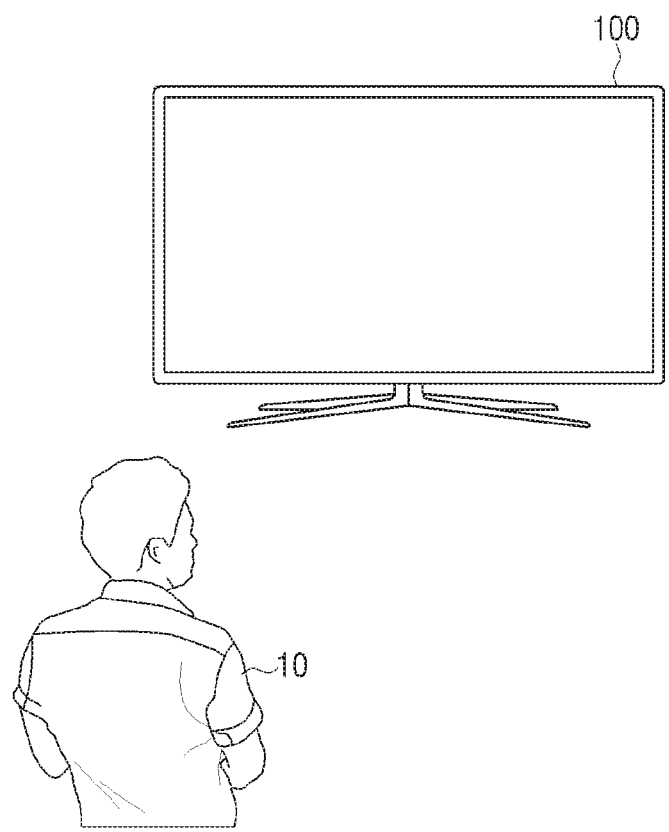
FIG. 1 is a diagram illustrating an electronic device, according to an example embodiment.

FIG. 1 is a diagram illustrating an electronic device, according to an example embodiment.

Referring to FIG. 1, an electronic device 100 may receive input of voice uttered by a user 10, and perform speech recognition of the user's voice and perform an operation according to an intention of utterance included in the user's voice.

For example, when voice uttered by the user 10, "Tell me the weather in Seoul", is input, the electronic device 100 may perform speech recognition of the corresponding voice, and search for information relating to weather in Seoul and display on the screen or output the found information as an audio signal.

The electronic device 100 performing this function may be implemented integrally with a broadcast content reception device such as a television or a set-top box. However, this is only an example, and the electronic device 100 may be implemented as a device of various types such as a smartphone, a tablet PC, and the like, or may be implemented as a separate speech recognition device.

In a case that predetermined voice is present in the user's voice, the electronic device 10 may perform speech recognition of only a part of the user's voice.

Here, the predetermined voice may include at least one of voice uttered by the user with the intention of canceling a voice uttered prior to the predetermined voice and voice uttered by the user meaninglessly.

For example, it is assumed that the user has uttered, "Tell me the weather in Suwon, or in Seoul". In this case, it may be understood that the expression "or" has been uttered with the intention of canceling the voice "Suwon" in "Tell me the weather in Suwon, or in Seoul".

In this case, the electronic device 100 may perform speech recognition of only "Tell me the weather in Seoul", which is uttered after "or" in "Tell me the weather in Suwon, or weather in Seoul", and provide the user with information about weather in Seoul according to the speech recognition result.

As another example, it is assumed that the user has uttered, "Tell me the um, weather in Seoul". In this case, it may be understood that the expression "um" is voice which is meaninglessly uttered by the user while hesitating in the middle of utterance.

In this case, the electronic device 100 may perform speech recognition of only "Tell me the weather in Seoul", which is the remaining voice where the "or" is excluded from "Tell me the um, weather in Seoul", and provide the user with information about weather in Seoul according to the speech recognition result.

As described above, according to the various example embodiments, even if voice requesting cancellation of the previous utterance or voice meaninglessly uttered by the user is input, speech recognition result corresponding to an intention of voice utterance of the user can be provided, which may enhance the user convenience.

Figure 2:
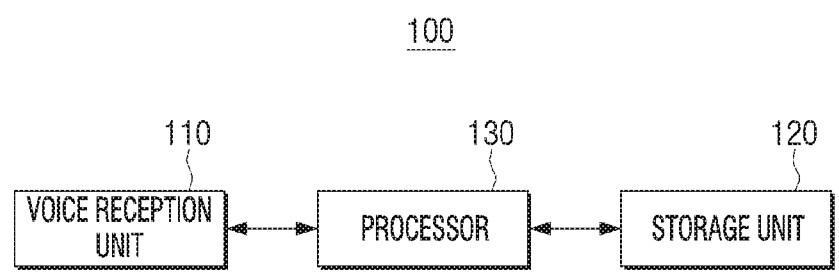
FIG. 2 is a block diagram illustrating a configuration of an electronic device, according to an example embodiment.

FIG. 2 is a block diagram illustrating a configuration of an electronic device, according to an example embodiment.

Referring to FIG. 2, the electronic device 100 may include a voice reception unit 110, a storage unit 120, and a processor 130.

The voice reception unit 110 may receive user's voice. That is, the voice reception unit 110 may be implemented as a microphone, etc. and receive voice uttered by the user.

In this case, the microphone may be built in the electronic device 100 and be integrally formed with the electronic device 100, or may be implemented as separated from the electronic device 100. When implemented as separate from the electronic device 100, the microphone may be implemented in a form that can be easily grabbed by the user or that can be laid on a table, etc. The microphone may be connected to the electronic device 100 by wires or a wireless network, to transmit the input user voice to the electronic device 100.

The storage unit 120 may store a module for speech recognition (hereinafter, "speech recognition module").

Here, the speech recognition module may, by means of a speech recognition module, perform speech recognition of the user's voice input through the voice reception unit 110, and output the speech recognition result accordingly.

In this case, the speech recognition result may include information relating to a text into which the user's voice has been converted by speech recognition, a speech recognition score and a domain to which the voice belongs. An example of the speech recognition result may be shown as in the Table 1 below.

TABLE 1

| | result text | confidence score | domain |
|---|---|---|---|
| 1 | volume up | 5300 | control command |
| 2 | volume down | 4200 | control command |
| 3 | App 1 | 3200 | application |

For example, the speech recognition module may, by performing speech recognition of user's voice, identify a text having a chance of matching with the user's voice, calculate a speech recognition score for each text on the basis of the chance that the text will match with the user's voice, and determine a text with the highest speech recognition score as a text corresponding to the user's voice. However, this is only an example, and the speech recognition module may perform speech recognition of the user's voice in various ways.

In this case, the speech recognition module may identify a domain to which the user's voice belongs from among a plurality of domains (for example, broadcast service, control command, application, etc.).

As described above, the speech recognition module may perform speech recognition of the user's voice and output information relating to a text into which the user's voice is converted, a speech recognition score and a domain to which the voice belongs.

Meanwhile, the storage unit 120 may store a first speech recognition module for recognizing user's voice and a second speech recognition module for recognizing only predetermined voice in the user's voice. That is, a speech recognition module stored in the storage unit 120 may include a first speech recognition module for recognizing user's voice and a second speech recognition module for recognizing only predetermined voice in the user's voice.

Here, the first speech recognition module may include a general speech recognition model which is modeled to recognize user's voice.

In contrast, the second speech recognition module may, unlike, the first speech recognition module, a speech recognition model which is modeled to recognize only predetermined voice.

Here, the predetermined voice may include at least one of voice uttered by the user with the intention of canceling a voice uttered prior to the predetermined voice and voice uttered by the user meaninglessly.

To this end, the second speech recognition module may be in a state of being trained to recognize only a set of words (for example, "or", "again again", etc.) indicating voice uttered by the user to cancel the previous voice during utterance and a set of words (for example, "um", "uh", "ah", etc.) indicating voice uttered by the user meaninglessly during utterance.

The storage 120 may be implemented by various storage media such as a hard disk, a nonvolatile memory, and/or a volatile memory.

The processor 130 may control an overall operation of the electronic device 100. To this end, the processor 130 may include a central processing unit (CPU), a random access memory (RAM), and a read only memory (ROM), and may execute an arithmetic operation or data processing associated with controlling the other elements included in the electronic device 100.

First, when user's voice is input, the processor 130 may drive a speech recognition module stored in the storage 120 and perform speech recognition of the user's voice.

In this case, when predetermined voice is present upon speech recognition through the speech recognition module, the processor 130 may control speech recognition to be performed for only a part of the speech recognition result excluding predetermined voice.

In detail, when user's voice is input via the voice reception unit 110, the processor 130 may drive the second speech recognition module and perform speech recognition of the user's voice input via the voice reception unit 110.

In addition, in a case that predetermined voice is present in the user's voice upon speech recognition through the second speech recognition module, the processor 130 may perform speech recognition of only a part of the user's voice through the first speech recognition module.

To this end, the processor 130 may identify whether the predetermined voice is included in the user's voice based on the speech recognition result of the second speech recognition module.

Here, the predetermined voice may include at least one of voice uttered by the user with the intention of canceling a voice uttered prior to the predetermined voice and voice uttered by the user meaninglessly.

In detail, the voice uttered by the user with the intention of canceling the previously-uttered voice is voice which is uttered when the user makes an erroneous utterance by mistake and desires to cancel the utterance, which may include, for example, "or", "again again", etc.

In addition, the voice uttered by the user meaninglessly is voice which is meaninglessly uttered while the user is thinking about what to say next during utterance, which may include, for example, "um", "uh", "ah", etc.

In this case, as described above, the second speech recognition module is in a state of being modeled to recognize only voice to cancel the previous voice and voice with little significance, and thus the processor 130 may identify whether the corresponding voice is present in the user's voice based on the speech recognition result of the second speech recognition module.

In addition, in a case that predetermined voice is present in the user's voice upon speech recognition through the second speech recognition module, the processor 130 may perform speech recognition of only a part of the user's voice through the first speech recognition module.

First, the processor 130 may, through the first speech recognition module, perform speech recognition of only voice present after the predetermined voice in the user's voice.

That is, in a case that the predetermined voice recognized through the second speech recognition module corresponds to voice uttered with the intention of canceling voice uttered by the user prior to the predetermined voice, the processor 130 may perform speech recognition of only voice present after the predetermined voice in the user's voice through the first speech recognition module.

In detail, in a case that voice to cancel the previously-uttered voice is present, when speech recognition is performed with respect to voice present prior to the corresponding voice, a speech recognition result not corresponding to the intention of utterance of the user may be provided. Accordingly, in a case that voice for canceling the previously-uttered voice is present in the user's voice, the processor 130 may perform speech recognition of only voice present after the voice for canceling the previously-uttered voice.

In this case, the processor 130 may identify an interval (for example, a time interval in which the corresponding voice is present in the entire user's voice) in which the voice for canceling the previously-uttered voice is present in the user's voice, and eliminate voice to the corresponding interval from the user's voice and then, perform speech recognition of the user's voice through the first speech recognition module.

In addition, the processor 130 may, through the first speech recognition module, perform speech recognition of only the remaining voice excluding the predetermined voice in the user's voice.

That is, in a case that voice uttered by the user meaninglessly is present, there is a possibility that the corresponding voice is recognized as voice associated with voices uttered by the user before and after, providing a speech recognition result that does not correspond to the intention of utterance of the user. Accordingly, in a case that voice meaninglessly uttered by the user is present, the processor 130 may perform speech recognition of only the remaining voice excluding the voice meaninglessly uttered by the user.

In this case, the processor 130 may identify an interval in which the voice meaninglessly uttered by the user is present in the user's voice, and eliminate voice of the corresponding interval from the user's voice and then, perform speech recognition of the user's voice through the first speech recognition module.

Meanwhile, the processor 130 may control an operation of the electronic device 100 based on the speech recognition result.

That is, in a case that voice for canceling the previously-uttered voice in the user's voice and voice meaninglessly uttered by the user are recognized through the second speech recognition module, the processor 130 may perform speech recognition of only voice present after the corresponding voice and the remaining voice excluding the corresponding voice through the first speech recognition module, and control the operation of the electronic device 100 based on the speech recognition result of the first speech recognition module.

As in the example described above, when speech recognition of "Tell me the weather in Seoul" is performed through the first speech recognition module, "Tell me the weather in Seoul" may be converted into text and output as the speech recognition result.

In this case, the processor 130 may identify an intention of utterance of the user through the corresponding text, transmit a keyword (for example, Seoul, weather, etc.) for searching for weather in Seoul, and receive, as a search result thereof, information relating to weather in Seoul and display it or output it through an audio signal.

However, this is only an example, and the processor 130 may control the electronic device 100 to perform various operations (for example, channel adjustment, volume control, application execution, etc.) based on the speech recognition result of the first speech recognition module.

However, as described above, the speech recognition result output from the speech recognition module may include a speech recognition score.

In this case, the speech recognition score is generated by digitizing the accuracy of how the text generated as a result of speech recognition matches with the voice actually uttered, and thus, when the speech recognition score is low, it may be understood that the speech recognition result is inaccurate.

Accordingly, even when the voice recognized score calculated by the second speech recognition module is low, when speech recognition is performed for only a part of the user's voice, there is a possibility that another operation irrelevant to the user's intention of utterance will be performed.

Accordingly, in a case that a speech recognition score calculated for predetermined voice by the second speech recognition module is greater than or equal to a predetermined threshold, the processor 130 may perform speech recognition of only a part of the user's voice through the first speech recognition module.

In this case, the predetermined threshold may be preset to a default value at the time of manufacturing of the electronic device 100, and then modified by the user.

Meanwhile, in a case that predetermined voice is not recognized in the user's voice through the second speech recognition module, the processor 130 may control the operation of the electronic device 100 based on the speech recognition result through the first speech recognition module.

That is, as a result of speech recognition through the second speech recognition module, in a case that voice uttered by the user to cancel the previously-uttered voice and voice meaninglessly uttered by the user are not present in the user's voice, it may be considered that only voice uttered by the user intended as a subject of speech recognition is present in the user's voice.

Accordingly, upon speech recognition through the second speech recognition module, in a case that voice for canceling the previous voice and voice with little meaning are not present in the user's voice, the processor 130 may perform speech recognition of the entire user's voice through the first speech recognition module, and control the operation of the electronic device 100 based on the speech recognition result of the first speech recognition module.

For example, it will be assumed that the "Tell me the weather in Seoul" uttered by the user is input through the voice reception unit 110.

The processor 130 may drive the second speech recognition module and perform speech recognition of "Tell me the weather in Seoul".

In this case, in "Tell me the weather in Seoul", voice for canceling the previous voice and meaningless voice are not present, and thus the second speech recognition module may not recognize "Tell me the weather in Seoul".

Accordingly, the processor 130 may, based on the speech recognition result of the second speech recognition module, identify that the voice for canceling the previous voice and the meaningless voice are not present in "Tell me the weather in Seoul".

In this case, the processor 130 may perform speech recognition of "Tell me the weather in Seoul" through the first speech recognition module.

Accordingly, when speech recognition of "Tell me the weather in Seoul" is performed through the first speech recognition module, "Tell me the weather in Seoul" may be converted into text and output as the speech recognition result.

In this case, the processor 130 may identify an intention of utterance of the user through the corresponding text, transmit a keyword (for example, Seoul, weather, etc.) for searching for weather in Seoul, and receive, as a search result thereof, information relating to weather in Seoul and display it or output it through an audio signal.

Meanwhile, in the example described above, when user's voice is input through the voice reception unit 110, the processor 130 may drive the first and second speech recognition modules together and perform speech recognition of the user's voice.

In this case, when it is determined based on the recognition result of the second speech recognition module, voice for canceling the previous voice and meaningless voice are present in the user's voice, the processor 130 may suspend speech recognition performed by the first speech recognition module, and eliminate a result of recognition in the first speech recognition module up to the time point of suspension.

In addition, the processor 130 may perform speech recognition again of only voice after the voice for canceling the previous voice in the user's voice through the first speech recognition module, or may perform speech recognition again of only the remaining voice other than the meaningless voice in the user's voice through the first speech recognition module.

Thereafter, the processor 130 may control an operation of the electronic device 100 based on the speech recognition result of the first speech recognition module.

According to the various example embodiments described above, even if voice unintentionally uttered by the user is input during speech recognition, the electronic device 100 eliminates the corresponding voice and performs speech recognition, and thus it is possible to perform an operation corresponding to a user's intention for voice utterance, even if the speech recognition is not performed again from the beginning.

In particular, the electronic device 100 includes an additional module for recognizing only voice unintended by the user, and thus the recognition performance for the corresponding voice can be strengthened.

In addition, the electronic device 100 may perform speech recognition of the user's voice and speech recognition of the voice unintended by the user in parallel, and thus it is possible to eliminate the voice unintended by the user from the user's voice without delay and perform an operation corresponding to the intention of user's utterance.

Figure 3:
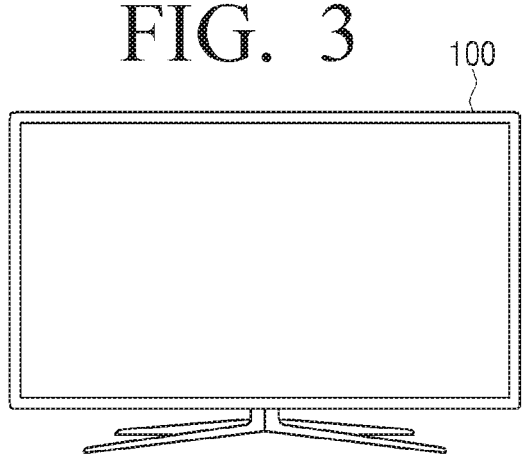
FIGS. 3 and 4 are diagrams illustrating a speech recognition operation of an electronic device, according to various example embodiments.
Figure 3:
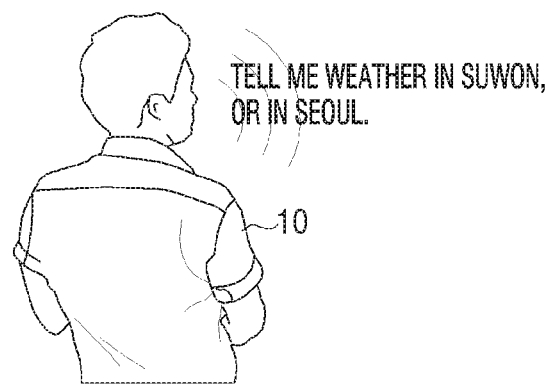
Figure 3:
Figure 3:
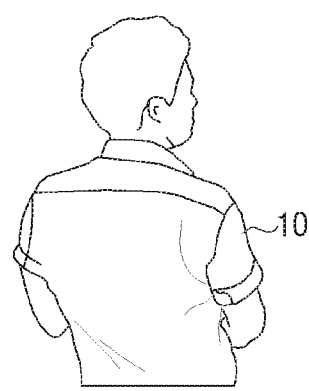
Figure 4:
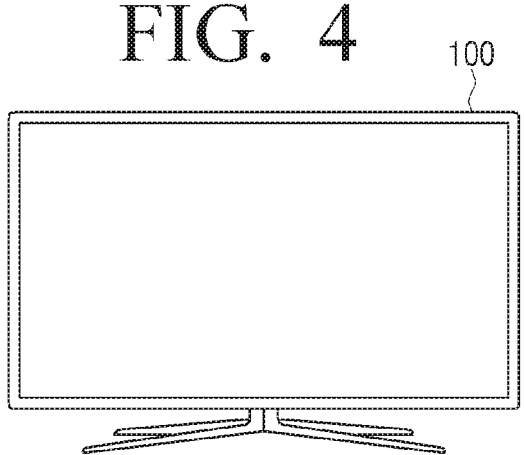
Figure 4:
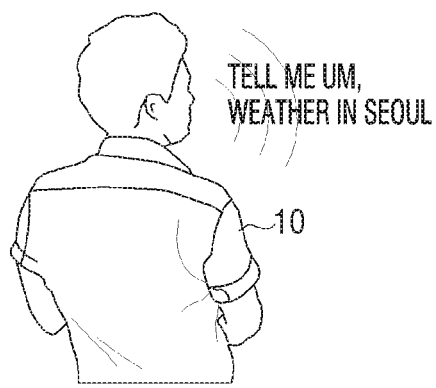
Figure 4:
Figure 4:
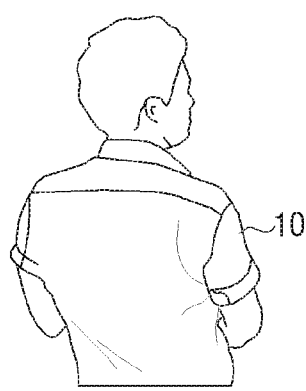

FIGS. 3 and 4 are diagrams illustrating a speech recognition operation of an electronic device, according to various example embodiments.

For example, it will be assumed that, as illustrated in FIG. 3A, the "Tell me the weather in Suwon, or in Seoul" uttered by the user 10 is input through the voice reception unit 110.

The processor 130 may drive the second speech recognition module and perform speech recognition of "Tell me the weather in Suwon, or in Seoul".

Here, the second speech recognition module is modeled to recognize voice for canceling the previously-uttered voice, and thus voice for canceling the previously-uttered voice, "or", may be recognized in the "Tell me the weather in Suwon, or in Seoul". In this case, the processor 130 may identify that "or" which is voice for canceling the previously-uttered voice is present in the user's voice based on the speech recognition result of the second speech recognition module. In addition, the processor 130 may identify an interval in which "or" is present in "Tell me the weather in Suwon, or in Seoul".

In this case, the processor 130 may eliminate voice up to the interval in which "or" is present, that is, "in Suwon, or" in "Tell me the weather in Suwon, or in Seoul", and perform speech recognition of only "Tell me the weather in Seoul" present after "or" in the user's voice through the first speech recognition module.

Accordingly, the processor 130 may search for weather in Seoul based on the speech recognition result of the first speech recognition module and display information relating to the weather in Seoul on the screen.

As another example, it will be assumed that, as illustrated in FIG. 4A, "Tell me the um, weather in Seoul" uttered by the user 10 is input through the voice reception unit 110.

The processor 130 may drive the second speech recognition module and perform speech recognition of "Tell me the um, weather in Seoul".

Here, the second speech recognition module is modeled to recognize voice meaninglessly uttered by the user, and may thus recognize voice meaninglessly uttered by the user, "um", in "Tell me the um, weather in Seoul". In this case, the processor 130 may identify that "um" which is voice meaninglessly uttered by the user is present in the user's voice based on the speech recognition result of the second speech recognition module. In addition, the processor 130 may identify an interval in which "um" is present in "Tell me the um, weather in Seoul".

In this case, the processor 130 may eliminate voice in the interval in which "um" is present, that is, "um,", in "Tell me the um, weather in Seoul", and perform speech recognition of only "Tell me the weather in Seoul" from which "um" is eliminated in the user's voice through the first speech recognition module.

Accordingly, the processor 130 may search for weather in Seoul based on the speech recognition result of the first speech recognition module and display information relating to the weather in Seoul on the screen.

Figure 5:
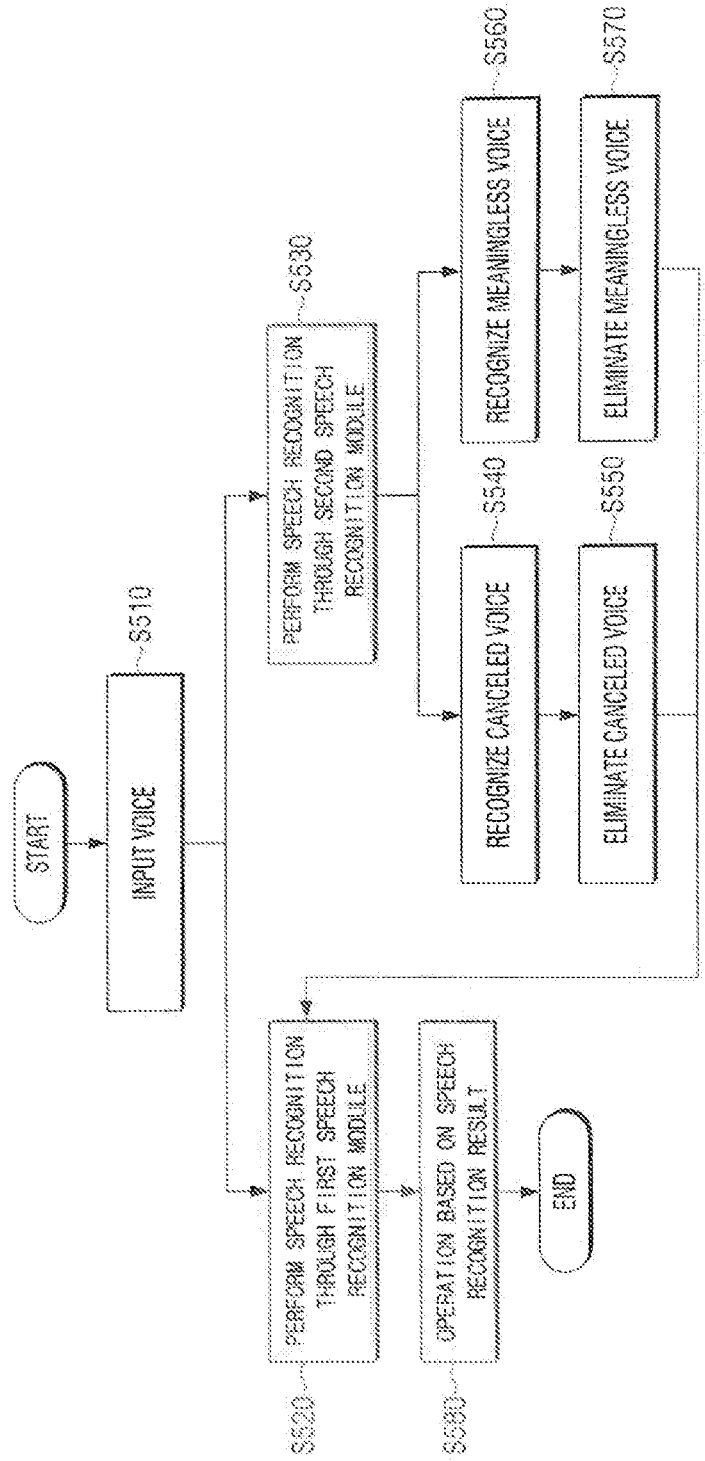
FIG. 5 is a flowchart illustrating a process of performing speech recognition of an electronic device, according to an example embodiment.

FIG. 5 is a flowchart illustrating a process of performing speech recognition of an electronic device, according to an example embodiment.

First, user's voice may be input, at operation S510.

Then, speech recognition of the user's voice may be performed through the first and second speech recognition modules, at operations S520 and S530.

In this case, in a case that a canceled voice is recognized in the user's voice upon speech recognition of the second speech recognition module, at operation S540, canceled voice and voice present prior to the canceled voice may be eliminated from the user's voice, at operation S550.

Then, in a case that meaningless voice is recognized in the user's voice upon speech recognition of the second speech recognition module, at operation S550, the meaningless voice may be eliminated from the user's voice, at operation S560.

Then, speech recognition of the entire user's voice that have been performed through the first speech recognition module may be suspended, speech recognition of the user's voice from which a part of voice has been eliminated may be performed based on at least one of the canceled voice and the meaningless voice, at operation S510. The corresponding operation may be performed based on the speech recognition result through the first speech recognition module, at operation S580.

However, in a case that the canceled voice and the meaningless voice are not recognized in the user's voice through the second speech recognition module, the corresponding operation may be performed based on the speech recognition result of the user's voice through the first speech recognition module.

FIG. 6 is a block diagram illustrating a detailed configuration of an electronic device, according to an example embodiment.

Figure 6A:
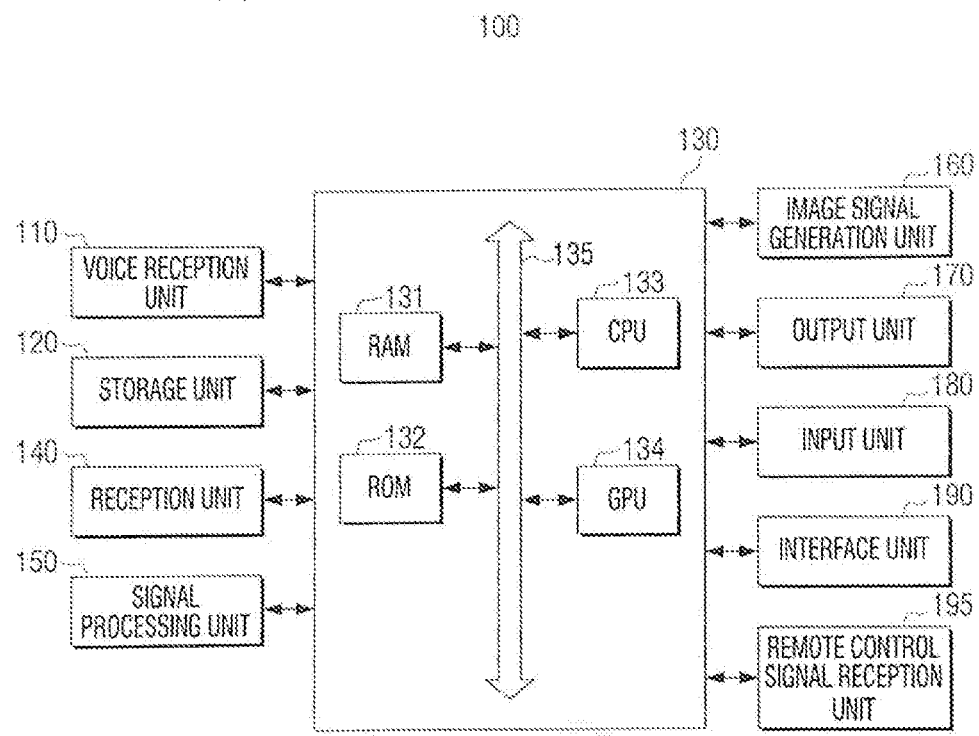
FIG. 6 is a block diagram illustrating a detailed configuration of an electronic device, according to an example embodiment.

Referring to FIG. 6A, the electronic device 100 may further include, in addition to the elements illustrated in FIG. 2, a reception unit 140, a signal processing unit 150, an image signal generation unit 160, an output unit 170, an input unit 180, an interface unit 190, and a remote signal reception unit 195. The operations of such elements may be controlled by the processor 130.

The storage unit 120 may store an operating system (OS) for controlling overall operations of the elements of the electronic device 100 and a command or data related to the elements of the electronic device 100.

Accordingly, the processor 130 may drive the operating system to control a number of hardware or software elements connected to the processor 130, load a command or data received from at least one of the other elements onto a volatile the memory and process it, and store various data in a non-volatile memory.

Figure 6B:
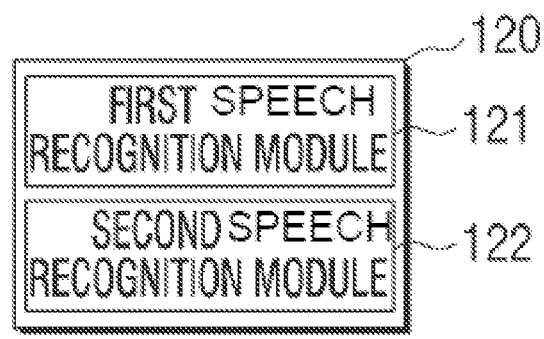

Meanwhile, the storage unit 120 may, as illustrated in FIG. 6B, store a first speech recognition module 121 and second speech recognition module 122 for performing speech recognition.

Here, the first speech recognition module 121 may include a general speech recognition model which is modeled to recognize user's voice. The second speech recognition module 122 may include, unlike the first speech recognition module, a speech recognition model which is modeled to recognize only predetermined voice.

At least a part of the speech recognition modules may be embodied as software, a program and so on, and may be implemented (for example, execution) by the processor 130.

The reception unit 140 may include various circuitry to receive a broadcast content (or a broadcast signal). The broadcast content may include images, audio, and additional data (for example, an EPG). The reception unit 140 may receive the broadcasting content from various sources such as terrestrial broadcasting, cable broadcasting, satellite broadcasting, Internet broadcasting, etc.

For example, the reception unit 140 may include various receiver circuitry, such as, for example, and without limitation, a tuner (not shown), a demodulator (not shown), an equalizer (not shown), or the like, to receive a broadcast content received from a broadcasting station.

The signal processing unit 150 may perform signal processing of a content received via the reception unit 140. More specifically, the signal processing unit 150 may perform signal processing of an image included in the content into a form that can be outputted at a display (not shown) of the output unit 170, by performing operations such as decoding, scaling, or frame rate conversion. Further, the signal processing unit 150 may perform signal processing such as decoding on the audio included in the contents and perform signal processing on the audio to a format that can be outputted in the audio output unit (not shown) of the output unit 170.

The image signal generation unit 160 may generate a Graphic User Interface (GUI) for a user. Further, the image signal generation unit 160 may add the generated GUI to an image that is processed by the signal processing unit 150.

The output unit 170 may include a display (not shown) for displaying an image outputted from the signal processing unit 150 and a GUI generated by the image signal generation unit 160, and an audio output unit (not shown) for outputting audio outputted from the signal processing unit 150.

In this case, the display (not shown) may be implemented as a Liquid Crystal Display (LCD) display, an Organic Light Emitting Diodes (OLED) display, or the like., and the audio output unit (not shown) may be implemented as a speaker (not shown), an external output terminal (not shown), or the like.

The input unit 180 may include various input circuitry that receives various user commands. The processor 130 may perform a function corresponding to the user command input through the input unit 180.

For example, the input unit 180 may receive a user command to perform the operations of switching channels, controlling volume, and the like, and the processor 130 may switch channels or adjust volume according to the input user command.

In particular, the input unit 180 may receive user's voice, and perform speech recognition of the user's voice and receive input of a user's command for initiating a speech recognition mode that operates correspondingly. In this case, the processor 130 may, when the speech recognition mode is initiated, receive user's voice uttered within a predetermined distance via the voice reception unit 110, and perform a speech recognition operation on the user's voice through the first speech recognition module and the second speech recognition module.

To achieve this, the input unit 180 may include various input circuitry, such as, for example, and without limitation, an input panel. The input panel may be implemented by using a touch pad, a key pad provided with various function keys, number keys, special keys, character keys, etc., or a touch screen.

The interface unit 190 may include various circuitry that connects various other electronic devices (not shown) and the electronic device 100. In this case, the processor 130 may transmit data which is pre-stored in the electronic device 100 to another electronic device (not shown) through the interface unit 190, or receive data from an electronic device (not shown).

For example, the interface unit 190 may include various interface circuitry, such as, for example, and without limitation, at least one of a High-Definition Multimedia Interface (HDMI) input terminal, a component input terminal, a PC input terminal, and a USB input terminal, or the like.

The remote control signal reception unit 195 may include various circuitry that receives a remote control signal input from a remote controller (not shown).

In this case, the remote control signal reception unit 195 may receive various remote control signals. For example, the remote control signal receiver 195 may receive a remote control signal to perform the operations of switching channels, controlling volume, and the like, and the processor 130 may switch channels in the electronic device 100 or control volume according to the received remote control signal.

In particular, the remote control signal reception unit 195 may receive a remote control signal for initiating the speech recognition mode. In this case, the processor 130 may, when the speech recognition mode is initiated, receive user's voice uttered within a predetermined distance via the voice reception unit 110, and perform a speech recognition operation on the user's voice through the first speech recognition module and the second speech recognition module.

Figure 7:
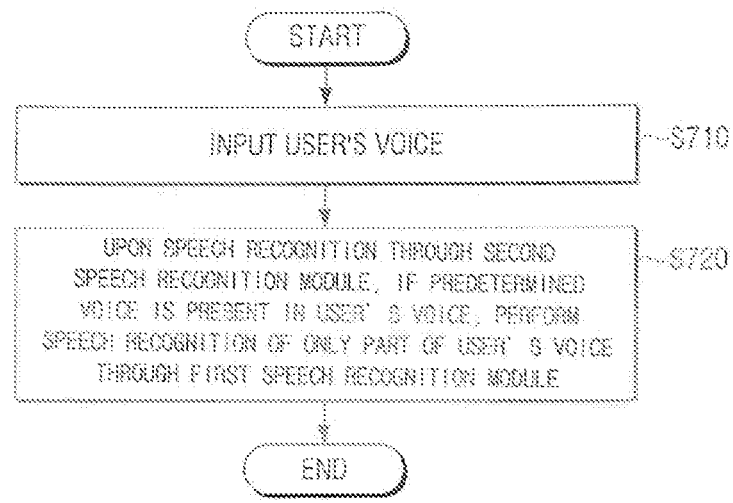
FIG. 7 is a flowchart illustrating a speech recognition method of an electronic device, according to an example embodiment.

FIG. 7 is a flowchart illustrating a speech recognition method of an electronic device, according to an example embodiment.

Meanwhile, the electronic device according to an example embodiment may store a first speech recognition module for recognizing user's voice and a second speech recognition module for recognizing only predetermined voice in the user's voice.

First, user's voice may be input, at operation S710.

Then, in a case that predetermined voice is present in the user's voice upon speech recognition through the second speech recognition module, speech recognition of only a part of the user's voice may be performed through the first speech recognition module, at operation S720.

Here, the predetermined voice may include voice uttered by the user with the intention of canceling voice uttered prior to the predetermined voice, and voice uttered by the user meaninglessly.

At operation S720, through the first speech recognition module, speech recognition of only voice present after the predetermined voice in the user's voice may be performed.

In addition, the predetermined voice may include voice meaninglessly uttered by the user.

At operation S720, through the first speech recognition module, speech recognition of only the remaining voice other than the predetermined voice in the user's voice may be performed.

Meanwhile, an operation of the electronic device may be controlled based on the speech recognition result.

In addition, at operation S720, in a case that a speech recognition score calculated for predetermined voice by the second speech recognition module is greater than or equal to a predetermined threshold, speech recognition of only a part of the user's voice may be performed through the first speech recognition module.

In addition, in a case that predetermined voice is not recognized in the user's voice through the second speech recognition module, the operation of the electronic device may be controlled based on the speech recognition result of the user's voice through the first speech recognition module.

Meanwhile, the first and second speech recognition modules and a method for performing speech recognition through the first and second speech recognition modules have been described above.

A non-transitory computer-readable medium where a program for sequentially performing the speech recognition method of the electronic device may be provided.

The non-transitory computer readable medium refers to a medium that stores data semi-permanently rather than storing data for a very short time, such as a register, a cache, a memory or etc., and is readable by an device. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Further, although the block diagrams of the electronic device omit a bus, communication among the respective components of the display device and servers may be performed via the bus. Further, each device may additionally include at least one of a processor such as CPU, a microprocessor, a hardware module, or a circuit to perform various steps explained above. Also, at least one of these components, elements or units may further include a processor such as a central processing unit (CPU) that performs the respective functions, a microprocessor, or the like.

The foregoing embodiments and advantages are merely exemplary and are not to be construed as limiting the present disclosure. The present teaching can be readily applied to other types of devices. Also, the description of the example embodiments is intended to be illustrative, and not to limit the scope of the claims, and many alternatives, modifications, and variations will be apparent to persons having ordinary skill in the art.

The invention claimed is:

1. An electronic device, comprising:
a display;
a voice input interface configured to receive a user voice input; and
a processor configured to:
receive the user voice input through the voice input interface,
based on a predetermined word input being included in the user voice input according to a first speech recognition operation, identify a part of the user voice input in which the predetermined word input is included, obtain a first text corresponding to a part of the user voice input excluding the predetermined word input included in the identified part, perform a function of a second speech recognition operation corresponding to the obtained first text, and output a first result relating to the part of the user voice input excluding the predetermined word input, and
based on the predetermined word input not being included in the user voice input according to the first speech recognition operation, obtain a second text corresponding to the user voice input, perform the function of the second speech recognition operation corresponding to the obtained second text and output a second result relating to the user voice input,
wherein the part of the user voice input excluding the predetermined word input comprises a first part and a second part,
wherein the predetermined word input is between the first part and the second part,
wherein the predetermined word input includes a voice input which is meaninglessly uttered by a user, and
wherein the first result of performing the function of the speech recognition corresponding to the obtained first text is same as the second result of performing the function of the speech recognition based on the obtained second text.

2. The electronic device as claimed in claim 1, wherein the processor is configured to based on the predetermined word input being included in the user voice input, perform the function of the speech recognition corresponding to only remaining voice input other than the predetermined word input included in the user voice input.

3. The electronic device as claimed in claim 1, wherein the processor is configured to control an operation of the electronic device based on the first result or the second result.

4. The electronic device as claimed in claim 1, wherein the processor is configured to, if a speech recognition score calculated for the predetermined word input is greater than or equal to a predetermined threshold, perform the function of the speech recognition corresponding to only a part of the user voice input.

5. The electronic device as claimed in claim 1, wherein the processor is configured to, when the predetermined word input is not recognized in the user voice input, control an operation of the electronic device based on the second result of the speech recognition of the user voice input.

6. The electronic device as claimed in claim 1, wherein the processor is configured to recognize the user voice input through a first speech recognition module and recognize the predetermined word input included in the user voice input through a second speech recognition module.

7. A speech recognition method of an electronic device, the speech recognition method comprising:
receiving a user voice input;
based on a predetermined word input being included in the user voice input according to a first speech recognition operation, identifying a part of the user voice input in which the predetermined word input is included, obtaining a first text corresponding to a part of the user voice input excluding the predetermined word input included in the identified part, performing a function of a second speech recognition operation corresponding to the obtained first text, and outputting a first result relating to the part of the user voice input excluding the predetermined word input, and based on the predetermined word input not being included in the user voice input according to the first speech recognition operation, obtaining a second text corresponding to the user voice input, performing the function of the second speech recognition operation corresponding to the obtained second text and outputting a second result relating to the user voice input, wherein the part of the user voice input excluding the predetermined word input comprises a first part and a second part, wherein the predetermined word input is between the first part and the second part, wherein the predetermined word input includes a voice input which is meaninglessly uttered by a user, and wherein the first result of performing the function of the speech recognition corresponding to the obtained first text is same as the second result of performing the function of the speech recognition based on the obtained second text.

8. The speech recognition method as claimed in claim 7, wherein the performing the function of the speech recognition corresponding to the obtained first text comprises: based on the predetermined word input being included in the user voice input, performing the function of the speech recognition corresponding to only remaining voice input other than the predetermined word input included in the user voice input.

9. The speech recognition method as claimed in claim 7, further comprising: controlling an operation of the electronic device based on the first result or the second result.

10. The speech recognition method as claimed in claim 7, wherein the performing the function of the speech recognition corresponding to the obtained first text comprises: if a speech recognition score calculated for the predetermined word input is greater than or equal to a predetermined threshold, performing the function of the speech recognition corresponding to only a part of the user voice input.

11. The speech recognition method as claimed in claim 7, further comprising: when the predetermined word input is not recognized in the user voice input, controlling an operation of the electronic device based on the second result of the speech recognition of the user voice input.

12. The speech recognition method as claimed in claim 7, wherein the user voice input is recognized by a first speech recognition module and the predetermined word input is recognized by a second speech recognition module.

13. An electronic device, comprising:
a display;
a voice input interface configured to receive a user voice input; and
a processor configured to:
receive the user voice input through the voice input interface,
based on a predetermined word input being included in the user voice input according to a first speech recognition operation, identify a part of the user voice input in which the predetermined word input is included, obtain a first text corresponding to a part of the user voice input excluding the predetermined word input, control the display to display the first text, perform a function of a second speech recognition operation corresponding to the obtained first text and output a first result relating to the part of the user voice input excluding the predetermined word input, and
based on the predetermined word input not being included in the user voice input according to the first speech recognition operation, obtain a second text corresponding to the user voice input, control the display to display the second text, perform the function of the second speech recognition corresponding to the obtained second text and output a second result relating to the user voice input,
wherein the part of the user voice input excluding the predetermined word input comprises a first part and a second part,
wherein the predetermined word input is between the first part and the second part, and
wherein the predetermined word input includes a voice input which is meaninglessly uttered by a user, and
wherein the first result of performing the function of the speech recognition corresponding to the obtained first text is same as the second result of performing the function of the speech recognition based on the obtained second text.

14. The electronic device as claimed in claim 13, wherein the processor is configured to recognize the user voice input through a first speech recognition module and recognize the predetermined word input included in the user voice input through a second speech recognition module.

* * * * *